(12) United States Patent
Monibi

(10) Patent No.: US 10,976,913 B2
(45) Date of Patent: Apr. 13, 2021

(54) ENABLING UNDO ON SCRUBBER/SEEKBAR UI WIDGETS

(71) Applicant: Disney Enterprises, Inc., Burbank, CA (US)

(72) Inventor: Mohamad H. Monibi, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 187 days.

(21) Appl. No.: 15/981,806

(22) Filed: May 16, 2018

(65) Prior Publication Data

US 2019/0114064 A1    Apr. 18, 2019

Related U.S. Application Data

(60) Provisional application No. 62/571,778, filed on Oct. 12, 2017.

(51) Int. Cl.
| | | |
|---|---|---|
| *G06F 3/048* | (2013.01) | |
| *G06F 3/0485* | (2013.01) | |
| *G06F 3/01* | (2006.01) | |
| *G06F 3/0488* | (2013.01) | |
| *G06F 3/16* | (2006.01) | |

(52) U.S. Cl.
CPC .......... *G06F 3/04855* (2013.01); *G06F 3/016* (2013.01); *G06F 3/0488* (2013.01); *G06F 3/04883* (2013.01); *G06F 3/165* (2013.01)

(58) Field of Classification Search
CPC .... G06F 3/04855; G06F 3/016; G06F 3/0488; G06F 3/04883; G06F 3/165
USPC ....................................................... 715/762
See application file for complete search history.

(56) References Cited

U.S. PATENT DOCUMENTS

| | | | |
|---|---|---|---|
| 8,572,513 B2* | 10/2013 | Chaudhri | G06F 3/0481 |
| | | | 715/863 |
| 8,954,852 B2 | 2/2015 | Oetzel et al. | |
| 9,110,562 B1 | 8/2015 | Edlway | |
| 9,411,422 B1 | 8/2016 | Mcclendon et al. | |
| 9,461,958 B1* | 10/2016 | Green | G06F 16/438 |
| 9,928,029 B2* | 3/2018 | Brown | G06F 3/0488 |
| 10,073,591 B2* | 9/2018 | Penha | G09G 5/00 |
| 10,506,198 B2* | 12/2019 | Maliuk | G06F 3/04842 |

(Continued)

OTHER PUBLICATIONS

Cipriani, How to undo accidententally scrubbing video on the new Apple TV, Nov. 20, 2015, <https://www.cnet com/how-to/how-to-undo-accidentally-scrubbing-video-on-the-new-apple-tv/>.

*Primary Examiner* — David Phantana-angkool
(74) *Attorney, Agent, or Firm* — Patterson + Sheridan, LLP

(57) ABSTRACT

Implementations of the disclosure describe systems and methods for a user that interacts with an interface for playback/consumption of media content (e.g. video, audio, e-book text, etc.) to be accurately guided back to one or more positions on a scrubber. Current scrubber positions (e.g., timecodes) may be dynamically saved each time that a user interacts with the scrubber. Thereafter, the saved position may be used to help guide the user back to their previous position along the scrubber. In some implementations, a scrubber may snap back to a saved position if it is within a predetermined threshold distance of the saved position. In some implementations, sensory cues such as haptic, visual, and/or auditory feedback may be provided when the scrubber snaps back to a saved position.

20 Claims, 7 Drawing Sheets

(56) References Cited

U.S. PATENT DOCUMENTS

| | | | |
|---|---|---|---|
| 10,645,294 B1* | 5/2020 | Manzari | H04N 5/232933 |
| 10,820,058 B2* | 10/2020 | Carrigan | H04N 21/8456 |
| 2008/0122796 A1* | 5/2008 | Jobs | G06F 3/0488 |
| | | | 345/173 |
| 2010/0042682 A1* | 2/2010 | Kaye | G11B 27/034 |
| | | | 709/203 |
| 2012/0092381 A1 | 4/2012 | Hoover et al. | |
| 2014/0313341 A1* | 10/2014 | Stribling | H04L 67/02 |
| | | | 348/157 |
| 2016/0100226 A1 | 4/2016 | Sadler et al. | |
| 2016/0370956 A1* | 12/2016 | Penha | H04N 21/47211 |
| 2017/0046058 A1 | 2/2017 | Karunamuni et al. | |
| 2017/0068402 A1 | 3/2017 | Lochhead et al. | |
| 2017/0357390 A1* | 12/2017 | Alonso Ruiz | G06F 3/0488 |
| 2018/0316962 A1* | 11/2018 | Prakash | G06F 3/04855 |
| 2019/0005981 A1* | 1/2019 | Belliveau | G11B 27/031 |
| 2019/0087082 A1* | 3/2019 | Chaudhri | G06F 3/04886 |
| 2019/0200089 A1* | 6/2019 | Pio | H04N 21/8456 |
| 2019/0342622 A1* | 11/2019 | Carrigan | H04N 21/21805 |
| 2020/0057555 A1* | 2/2020 | Walkin | G06F 3/04883 |
| 2020/0066305 A1* | 2/2020 | Spence | H04N 21/8549 |

\* cited by examiner

Current Position of Player

Saved Position 1          New Position

ENABLING UNDO ON SCRUBBER/SEEKBAR UI WIDGETS

CROSS-REFERENCE TO RELATED APPLICATIONS

This application claims the benefit of U.S. Provisional Patent Application No. 62/571,778 filed Oct. 12, 2017 and titled "ENABLING 'UNDO' ON SCRUBBER/SEEKBAR UI WIDGETS," which is incorporated herein by reference in its entirety.

SUMMARY

Implementations described herein are directed towards systems and methods for a user that interacts with an interface for playback/consumption of media content (e.g. video, audio, e-book text, etc.) to be accurately guided back to one or more positions on a scrubber. Current scrubber positions (e.g., timecodes) may be dynamically saved each time a user interacts with the scrubber. Thereafter, the saved position may be used to help guide the user back to their previous position along the scrubber.

In one embodiment, a method includes: receiving first data generated by a user moving a scrubber displayed on a content playback graphical user interface from a first position to a second position, where the first data represents a scrub action; in response to receiving the first data, saving the position of the scrubber corresponding to the first position; receiving second data generated by the user undoing the scrub action; and in response to receiving the second data, moving the scrubber back to the saved first position.

In implementations, receiving second data generated by the user undoing the scrub action includes: receiving data corresponding to the user moving the scrubber toward the first saved position. In implementations, the method further includes: determining if the scrubber is within a threshold distance of the saved first position.

In implementations, the method further includes: snapping the scrubber to the saved first position in response to determining that the scrubber is within the threshold distance. In such implementations, the method may further include: providing haptic, visual, or aural feedback to the user indicating that the scrubber was snapped to the saved first position.

In particular implementations, haptic feedback indicating that the scrubber was snapped to the saved first position is provided to the user. The provided haptic feedback may include actuating a haptic motor in a handheld device. The handheld device may include a touchscreen mobile device, a remote control, or a video game console controller. In particular implementations, the handheld device is a touchscreen mobile device that presents the content playback graphical user interface, where receiving the first data representing the scrub action includes receiving data corresponding to the user swiping the scrubber from the first position to the second position.

In implementations, the saved first position includes a saved time code corresponding to a playback position of video or audio content presented to the user on the content playback graphical user interface, and determining that the scrubber is within the threshold distance includes determining that a current playback position of the scrubber is within a predetermined temporal distance of the saved time code.

In implementations, the saved first position includes a saved position of the scrubber along a length of a time bar of the scrubber, and determining that the scrubber is within the threshold distance includes determining that a current playback position of the scrubber on the time bar is within a predetermined distance of the saved position along the length of the time bar.

In implementations, the method further includes: displaying the content playback graphical user interface, including the scrubber, where the content playback graphical user interface is to play back video content or audio content.

In embodiments, the above-described method and its operations may be implemented by executing instructions stored in a non-transitory computer-readable medium. For example, the instructions may be stored in a storage of a mobile device, a laptop, a desktop computer, a gaming console, a set top box, a television, a server, or some other device(s).

Other features and aspects of the disclosed technology will become apparent from the following detailed description, taken in conjunction with the accompanying drawings, which illustrate, by way of example, the features in accordance with implementations of the disclosed technology. The summary is not intended to limit the scope of any inventions described herein, which are defined by the claims and equivalents.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

The figures are not exhaustive and do not limit the present disclosure to the precise form disclosed.

DETAILED DESCRIPTION

A common user interface (UI) widget used in interfaces for playback and consumption of digital media and/or content is the scrubber, which is sometimes referred to as the scrub bar, seekbar, or time bar. For example, when watching video on a device, the viewer may use the scrubber to move back in time (e.g., by dragging a slider or other control along the scrubber) in the video in an attempt to go back to a previous moment or scene. However, this conventional method of using scrubbers suffers from a number of problems. First, the challenge for the user to remember the exact moment in a video that a section of the scrubber corresponds to, combined with the lack of precision offered by the typical scrubber, makes for a frustrating user experience. Additionally, the user may accidentally interact with the scrubber, causing the video to jump to a different time in the video. For example, a user may inadvertently touch the scrubber and jump to a future scene in a movie, thereby ruining the experience. In such a situation, the user may attempt to try and undo their accidental interaction by manually seeking back to their previous position, without knowing the exact position they left off. An interactive UI widget that accurately guides the user to a saved position or time of playback would greatly reduce these problems.

Embodiments described herein are directed towards systems and methods that for a user that interacts with an interface for playback/consumption of media content (e.g. video, audio, e-book text, etc.) to be accurately guided to various positions along the scrubber (e.g. seekbar). In accordance with implementations, current scrubber positions (e.g., timecodes) may be dynamically saved each time a user interacts with the scrubber. Thereafter, the saved position may be used to help guide the user back to their previous position along the scrubber if the user attempts to do so. By virtue of this function, a user may be provided an intuitive mechanism for easily navigating back to a previous position on the scrubber (e.g., either forward or backward in time). The systems and methods described herein may greatly enhance the user experience while using a scrubber for playback and consumption of digital media such as video and audio.

Figure 1A:
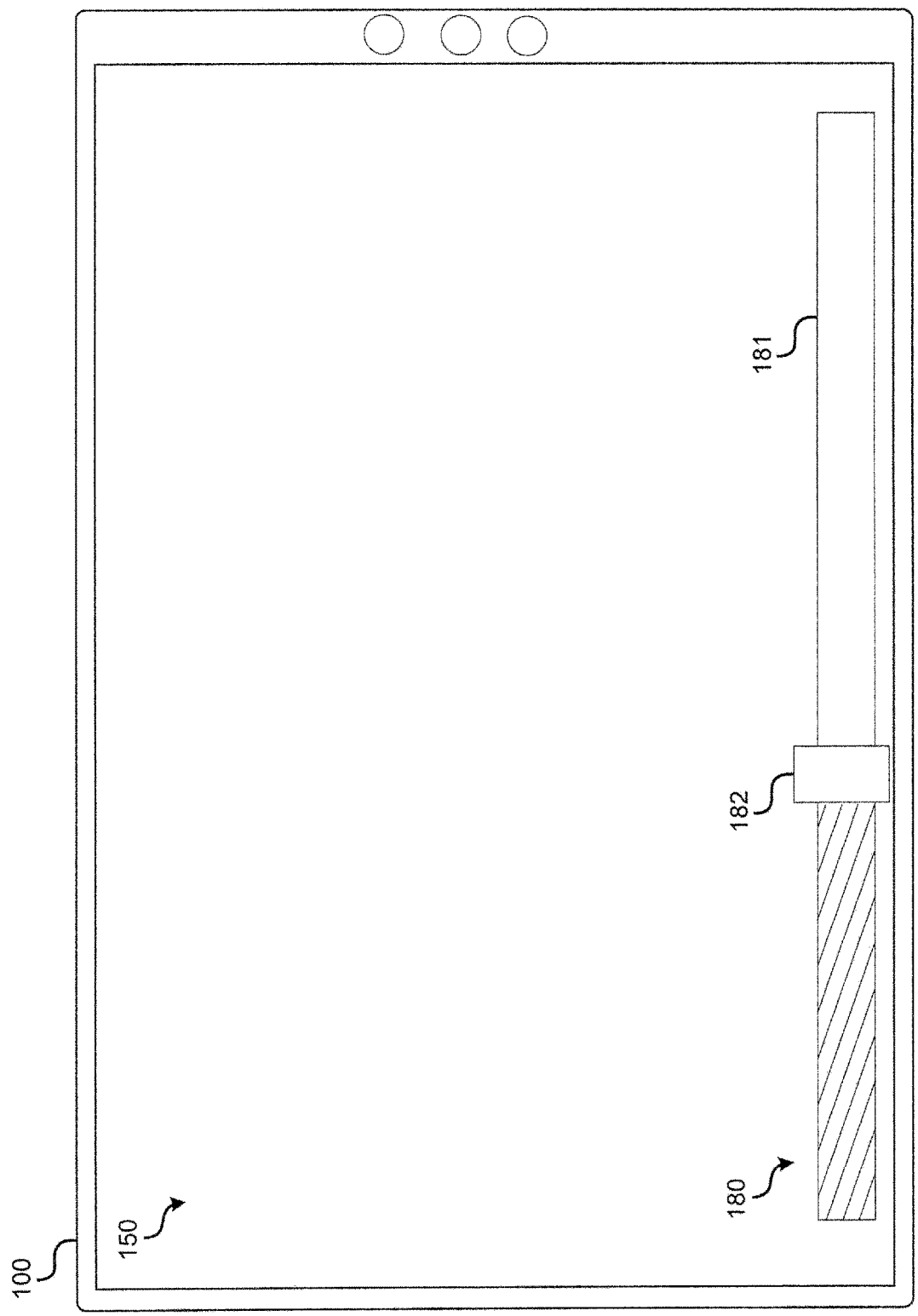
FIG. 1A illustrates an example device in which embodiments described herein may be implemented.
Figure 1B:
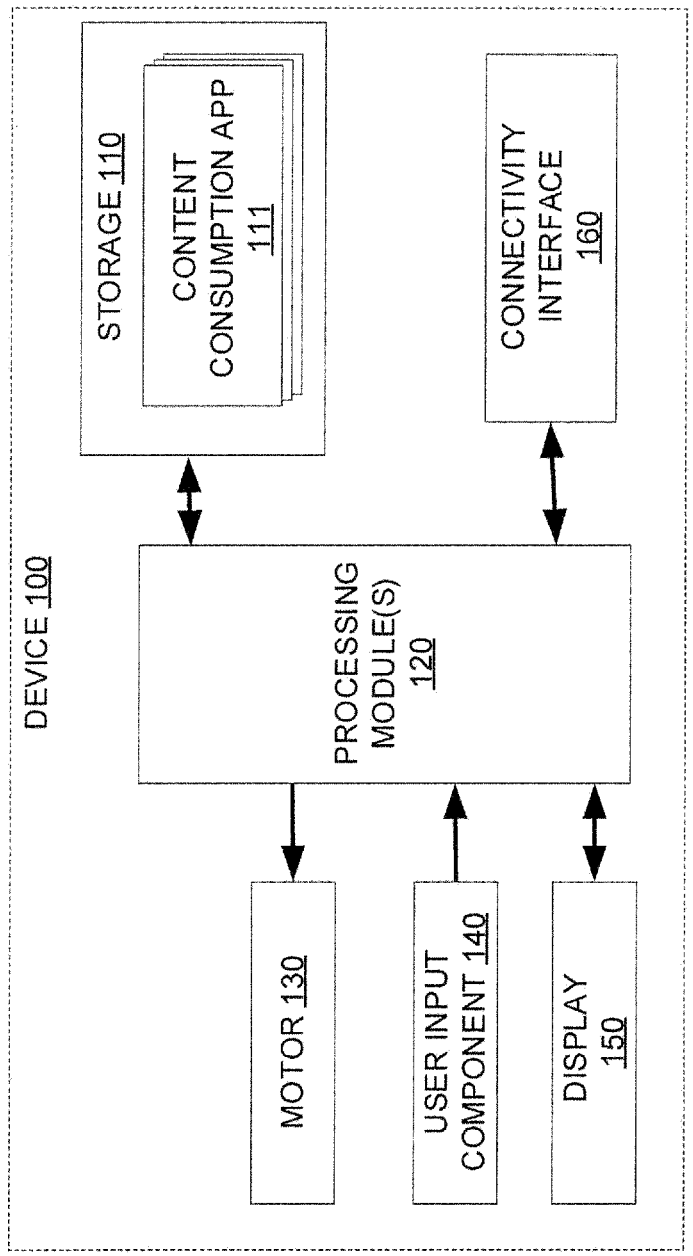
FIG. 1B is a block diagram illustrating an example architecture for components of the device of FIG. 1A.

FIG. 1A illustrates an example device 100 in which embodiments described herein may be implemented. FIG. 1B is a block diagram illustrating an example architecture for components of device 100. As illustrated in the example of FIG. 1A, device 100 includes a display 150 that presents a content consumption graphical user interface for playback of video, audio, or other content (not shown). The content consumption graphical user interface may be presented by executing a content consumption application stored in storage 110. For example, the content consumption application 111 may provide a video player associated with a service that the user subscribes to using a user account. As part of that service, the user may receive content over an RF data network (e.g., using a home cable or Ethernet plan, or cellular plan). The user may connect to the RF data network using a connectivity interface 160 such as for example, a network interface card or cellular receiver.

As part of the content consumption graphical user interface, a scrubber 180 is displayed that shows the user the progress of the content being presented to the user. For example, if the content being presented to the user is video content, a position of the scrubber may indicate to the user at what moment in time (e.g., timecode) the presented content is currently playing. For instance, as illustrated by FIG. 1A, the content is about 40% of the way through playback.

As illustrated in the example of FIG. 1A, scrubber 180 comprises a scrub time bar 181 and control 182 (e.g., a slider) that the user of device 100 may slide along time bar 182 to move to different times of the content being presented to the user of mobile device 100. Other variations of scrubber 180 may be implemented in accordance with the technology disclosed herein. For example, the scrubber may display multiple controls or no controls. In the case of no controls, the temporal progress of the content may be indicated by color coding, shading, or otherwise modifying the time bar 182 as the content is temporally presented to the user.

In implementations, scrubber 180 may pop up into view when the user actuates a user input component 140 (e.g., taps display 150) of device 100. For example, scrubber 180 may be overlaid over the bottom of a video being played back to the user. Alternatively, the video being played back to the user may be windowed above scrubber 180 when it pops up into view. In implementations, scrubber 180 may be hidden from view after a predetermined amount of time has passed after it appeared. In some implementations, scrubber 180 may also display a video thumbnail to the user (not shown) to facilitate in navigating to a particular moment in time in a video.

As illustrated in the example of FIG. 1A, device 100 is a mobile device having a touchscreen. For example, device 100 may be a smartphone, tablet, or other similar device. However, in other implementations, device 100 may be a laptop computer, a desktop computer, a smartwatch, a television, a headmounted display, a gaming console, a set top box, or other device capable of causing a content consumption graphical user interface, including a scrubber 180, to be displayed. In such implementations, the user input components 140 may include, for example, a touchscreen, a mouse, a keyboard, a remote control, a gaming controller, or other user input component 140 that permits the user of device 100 to manipulate the scrubber 180.

In various embodiments, as part of the content consumption graphical user interface, as soon as the user interacts with or otherwise engages scrubber 180, a current position (e.g., timecode) of the content may be saved. For example, a saved timecode may represent the actual time in the digital content (e.g., movie) that the scrubber corresponds to when the scrubber was interacted with by the user. The saved timecode may then be used to help guide the user back to their previous position along the scrubber if the user attempts to do so. The saved timecode allows for an "undo" action that enables content playback from a previous, desired time. The undo function may allow the user to return to a previously saved or marked position. For example, if the user unintentionally or accidentally interacts with the scrubber, the user may interact with the content consumption interface to undo the accidental scrubber action and return the scrubber to its previous position. The undo implementation of the scrubber may also allow the user to quickly return to a position of last interaction (e.g. the last viewed scene in a movie) if the user intentionally moved the scrubber, but decided to go back. For example, if the user advances forward in time of a movie to preview a scene, or backward in time in the movie to review a scene, the user may quickly return back to a saved position of the scrubber.

Figure 2:
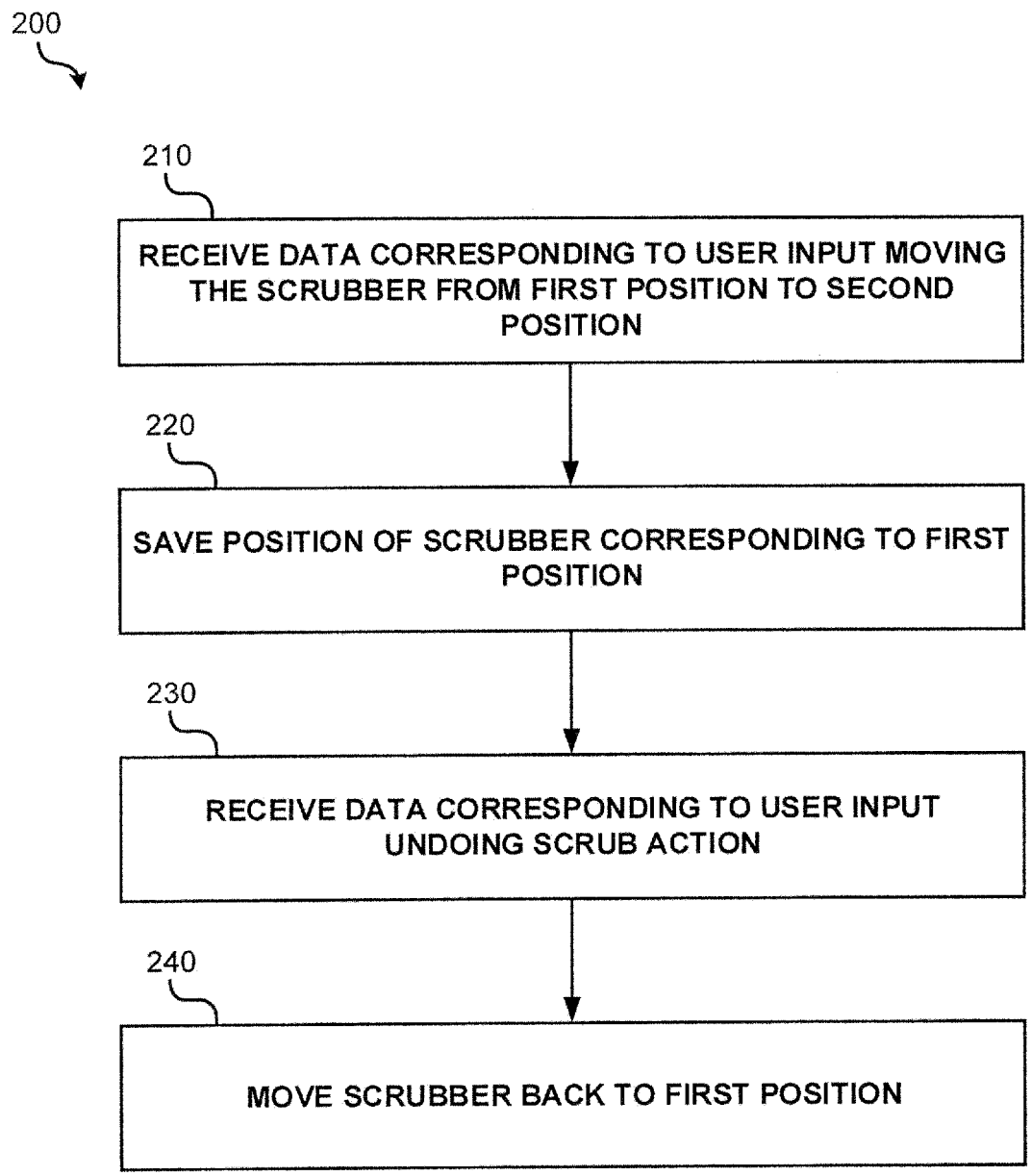
FIG. 2 is an operational flow diagram illustrating an example method that may be used to implement a scrubber undo function, in accordance with implementations.

FIG. 2 is an operational flow diagram illustrating an example method 200 that may be used to implement this undo functionality. At operation 210, device 100 may receive data corresponding to user input moving from a first position to a second position of the scrubber 180. For example, if the user is using a touchscreen display, the user may swipe along scrubber 180 (e.g., swipe slider 182 from left to right or from right to left along time bar 181). As another example, if the user is using a laptop, the user may click and drag slider 182 along time bar 181 of scrubber 180. As yet another example, a user may use a controller of a gaming system to navigate to different positions along scrubber 180.

At operation 220, in response to receiving the data, a position of the scrubber 180 corresponding to the first position may be stored in a storage (e.g., storage 110). For instance, the position may be saved in a temporary memory or database associated with application 111. In some implementations, a saved position may be a timecode corresponding to a current playback time of the content (e.g., time "50:02" of a movie). In some implementations, a saved position may correspond to a relative position of the scrubber along its length. For example, the position may be stored as a number such as a decimal, a percentage (e.g., 40% in the example shown in FIG. 1A), or some other variable that may be used to indicate a position of the scrubber. In some implementations, a saved position may correspond to a current video frame number of video content that is being played back. In some implementations, any combination of a timecode, a relative position of the scrubber along its length, and/or a video frame number may be saved.

In various implementations, the position of the scrubber may be stored as soon as the user interacts with the scrubber, even if the user does not navigate the scrubber to a different position. For example, if the user pauses the content by tapping slider 182, the position of the scrubber may be stored even if the user does not navigate to a different time in the content using scrubber 180. As another example, the position may be stored as soon as the user causes the scrubber to appear (e.g., by tapping the screen) even if the content is not paused.

At operation 230, device 100 may receive data corresponding to user input undoing the scrub action. Various user inputs and/or user interface gestures may be used to undo the scrub action. For example, as further described below, if the user swipes the scrubber to within a predetermined distance of the first position, the scrubber may automatically snap to the first position. As another example, if the user is utilizing a device having a keyboard, the user may type a series of keys (e.g., Ctrl Z) to cause the scrubber to move back to the first position. At operation 240, in response to receiving the user input, the scrubber moves back to the first position.

Although the example illustrated by FIG. 2 shows a single "undo" action, it should be noted that in some embodiments, a plurality of positions may be saved. In such embodiments, a plurality of successive undo actions may be performed. For example, consider the case where the user moves the scrubber from a first position to a second position, watches the content for a brief period, and then moves the scrubber from a third position to a fourth position. In such cases, the position (e.g., timecode) of the scrubber may be stored for the first position and third position. As such, when the user is at the fourth position, the user may navigate the scrubber back to the third position by executing a first undo action, and navigate the scrubber back to the first position by executing a second undo action.

Figure 3:
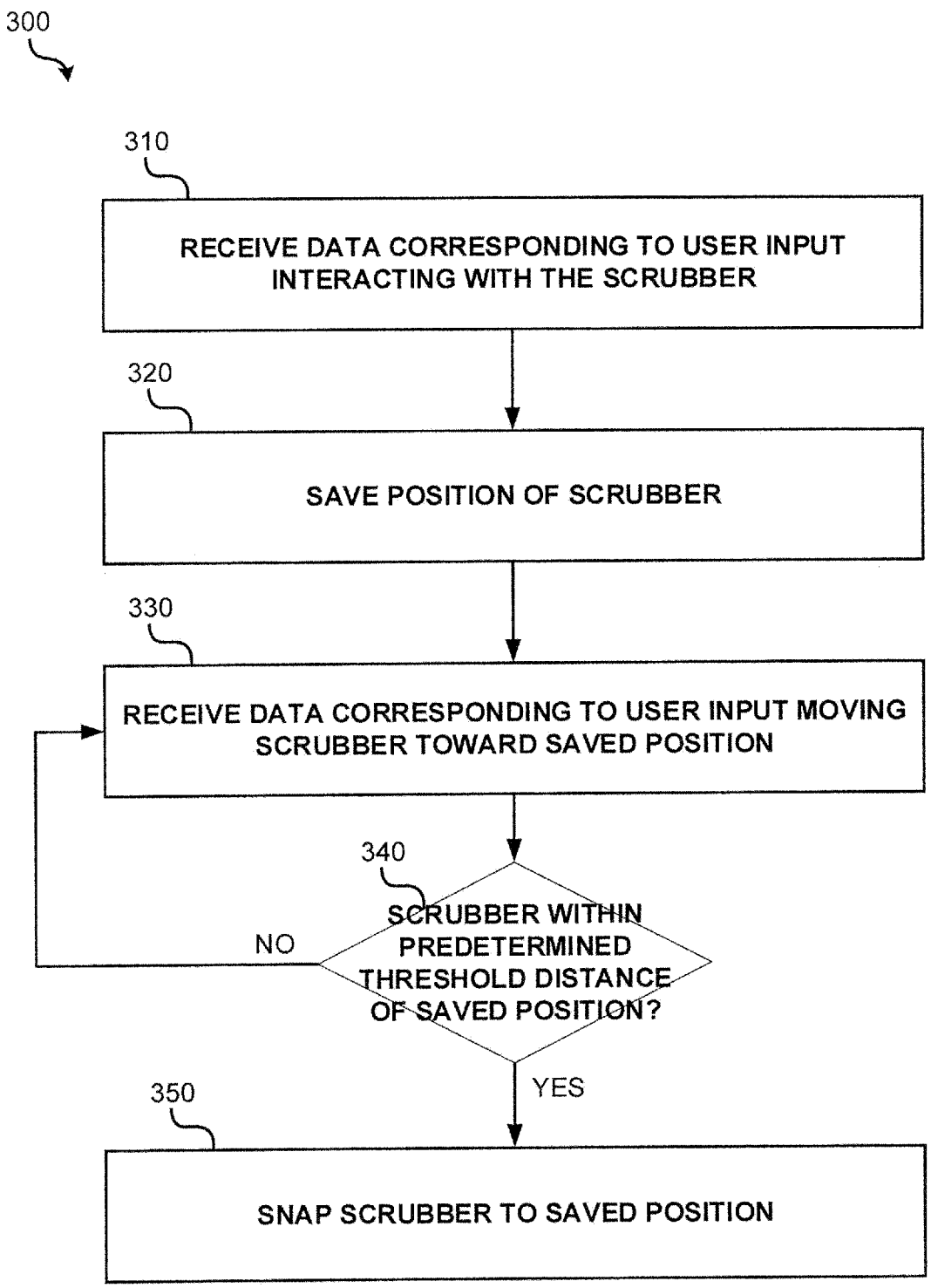
FIG. 3 is an operational flow diagram illustrating an example method that may be used to implement a scrubber undo function, including snapping back to a previously saved position, in accordance with implementations.
Figure 4A:
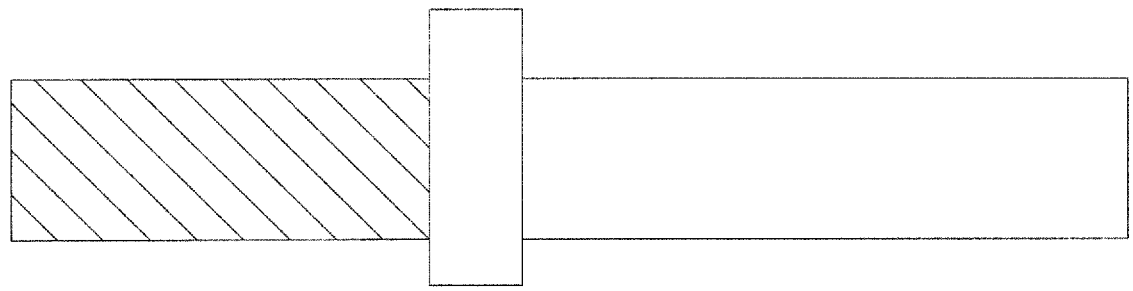
FIG. 4A illustrates a scrubber during the method of FIG. 3.
Figure 4B:
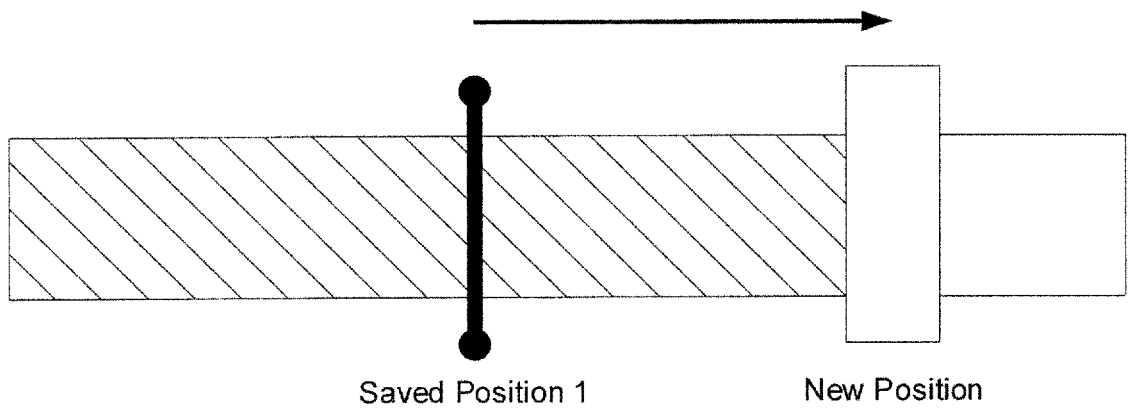
FIG. 4B illustrates a scrubber during the method of FIG. 3.
Figure 4C:
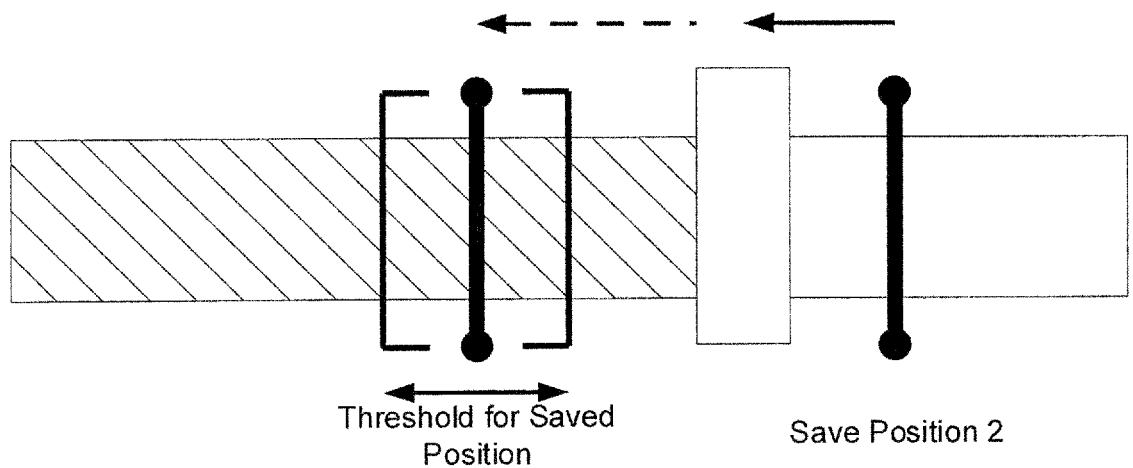
FIG. 4C illustrates a scrubber during the method of FIG. 3.
Figure 4D:
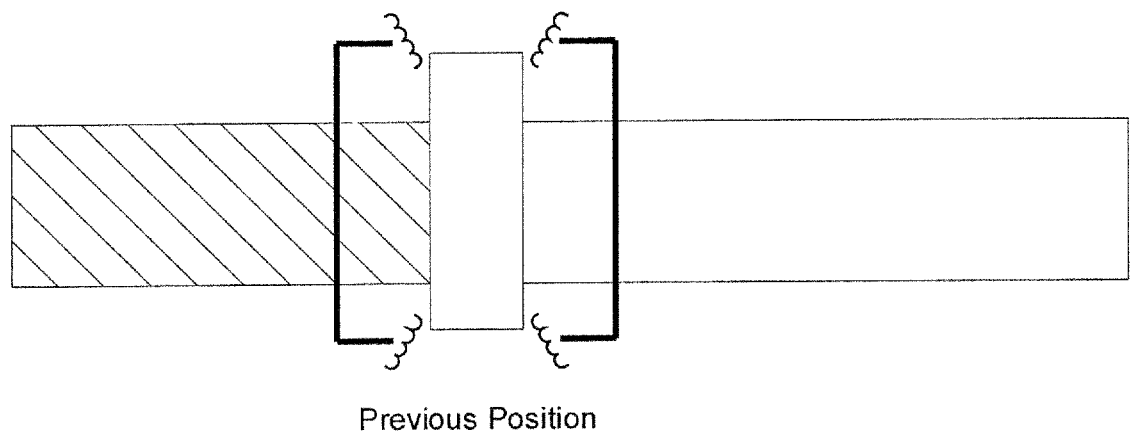
FIG. 4D illustrates a scrubber during the method of FIG. 3.

As noted above, in some embodiments, when a user interacts with the scrubber when using a content consumption interface, positional movement along the scrubber (e.g. sliding of the finger back and forth along the scrubber) may enable the user to "snap" to a previously saved position. The snap may return, for example, to a previously saved timecode. FIG. 3 is an operational flow diagram illustrating an example method 300 that may be used to implement this functionality. FIG. 3 will be described in conjunction with FIGS. 4A-4D, which illustrate the scrubber at different times during method 300. FIG. 4A illustrates the scrubber before implementation of method 300 and FIG. 4D illustrates the scrubber after implementation of method 300.

At operation 310, data corresponding to user input interacting with the scrubber is received at device 100. At operation 320, in response to receiving the data, a position (e.g., timecode) of the scrubber is saved. As illustrated by the example of FIG. 4B, a timecode has been saved for position 1. As illustrated by the example of FIG. 4C, any additional user interaction with the scrubber widget may allow for the storage of an additional timecode at position 2. The user may, for example, proceed forward or backwards in the content without fear of losing the saved timecode at position 2. Although the example of FIGS. 4A-4D illustrates the storage of two timecodes, as discussed above with reference to method 200, in some implementations only one timecode position or more than two time code positions may be stored at a time.

At operation 330, data corresponding to user input moving the scrubber toward the saved position (e.g., time code) is received. At decision 340, in response to receiving the data, it is determined whether the scrubber is within a predetermined threshold distance of the saved position. For example, it may be determined if the scrubber position is within 5 minutes, 3 minutes, 1 minute, or some other temporal position of the saved timecode. In some implementations, this threshold distance may be a temporal percentage of the length of the content or a percentage of the length of a time bar of the scrubber. For example, if the content is a movie that is 100 minutes in length, and the threshold distance is based on whether a scrubber time code is within plus or minus 3% of a saved timecode, it may be determined if the current scrubber position is within plus or minus three minutes of the saved timecode. As another example, if the time bar is 100 units in length, and the threshold distance is based on whether a scrubber position is within plus or minus 3% of the length of the time bar from the saved position, it may be determined whether the current scrubber position is within plus or minus three units of the saved position.

At operation 350, if the scrubber is within a predetermined threshold distance of the saved position, the scrubber may be snapped into the saved position. As illustrated by the example of FIG. 4C, the user moves backwards in the media content. As illustrated, backwards movement from a saved timecode position, as depicted in FIG. 4C, enables a snap back to the previously saved timecode, where the progression bar (e.g. slider) of the media content (e.g. movie) returns the user to a previously saved point in the content. For example, as illustrated by FIG. 4D, interaction with the scrubber widget in a backwards motion may snap the position of the slider back to saved timecode position 1.

In some implementations, once the user interacts with the scrubber widget and snaps to a previously saved position, the snap may provide haptic feedback using vibration motors 130 or other haptic feedback means of a device 100. For example, a smartphone, tablet, laptop, smartwatch, a television remote, a gaming controller, or other content consumption device (or user input component of the device) may vibrate in response to a user snapping to a position on the scrubber. By way of particular example, if the user interacts with the scrubber widget using a television remote or gaming controller in such a manner that causes it to snap into place, a haptic motor of the television remote or gaming controller may vibrate in response to snapping. The haptic feedback may allow the user to realize the command of the snap through physical sensation. For example, once the user interacts with the scrubber widget on the content consumption device, the snap may provide a haptic sensation felt by the user, allowing them to realize that the snap has taken place. The haptic feedback may, therefore, allow the user to realize that the snap has taken place in the event that the user interaction with the scrubber was unintentional or accidental.

In some embodiments, once the user interacts with the scrubber widget and snaps to a previously saved position, the snap may provide haptic feedback through vibration motors within or on the device and the haptic feedback is augmented by visual cues. In certain implementations, the visual cue could be a visual representation of the saved position on the scrubber widget. In certain implementations, visual cues indicating the snap back may be provided without any haptic feedback.

In some embodiments, once the user interacts with the scrubber widget and snaps to a previously saved position, the snap may provide haptic feedback through vibration motors within or on the device and the haptic feedback is augmented by auditory cues. In certain implementations, the audio cue allows for notification to the user that the snap taken place, and may be enabled or un-enabled depending on user preference. In certain implementations, auditory cues indicating the snap back may be provided without any haptic feedback.

In some embodiments, the user may augment the scrubber widget with snapping and feedback functionality to guide users to certain positions, timecodes, or points of interest. The feedback may be haptic, visual, and/or aural. The feedback may allow users to pinpoint and/or seek saved timecodes within media content (e.g. movies, songs, podcasts, e-books, etc.).

In some implementations, the interaction with the scrubber widget may enable haptic feedback or other types of sensory feedback (e.g. visual, auditory, etc.) to alert the user that the timecode has been saved, for example.

In some implementations, sensory feedback cues (e.g., haptic, visual, auditory, etc.) may be provided in response to a user navigating to within a predetermined threshold distance of a saved position, and prior to performing a snap operation. In such implementations, the user may realize a snapping action by actuating a control after receiving the sensory feedback cue.

Figure 5:
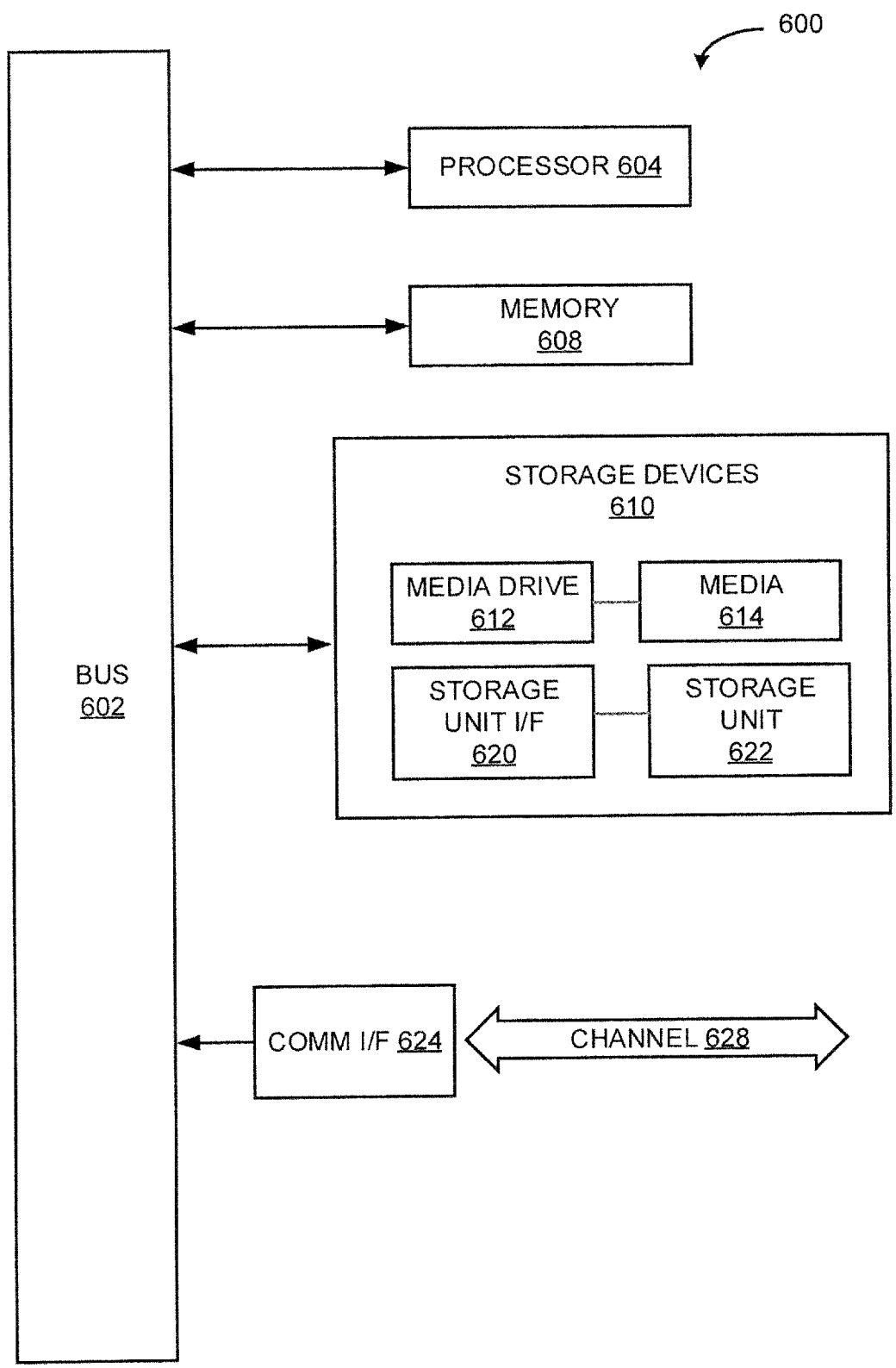
FIG. 5 illustrates an example computing module that may be used to implement various features of the methods disclosed herein.

FIG. 5 illustrates an example computing module that may be used to implement various features of the methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 5. Various embodiments are described in terms of this example—computing module 600. After reading this description, it will become apparent to a person skilled in the relevant art how to implement the application using other computing modules or architectures.

Referring now to FIG. 5, computing module 600 may represent, for example, computing or processing capabilities found within desktop, laptop, notebook, and tablet computers; hand-held computing devices (tablets, PDA's, smart phones, cell phones, palmtops, etc.); wearable devices (e.g., HMD); mainframes, supercomputers, workstations or servers; gaming consoles; televisions; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid state drive, a magnetic tape drive, an optical disk drive, a CD or DVD drive (R or RW), or other removable or fixed media drive might be provided. Accordingly, storage media 614 might include, for example, a hard disk, a solid state drive, magnetic tape, cartridge, optical disk, a CD, DVD, or Blu-ray, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory media, volatile or non-volatile, such as, for example, memory 608, storage unit 622, and media 614. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

What is claimed is:

1. A computer-implemented method, comprising:
during playback of media content, receiving a first user input specifying to move a scrubber from a first playback position to a desired playback position, wherein the first playback position comprises a current playback position at a first point in time, and wherein the scrubber is displayed on a content playback graphical user interface;
dynamically saving the first playback position based on the first user input;
causing playback of the media content to jump to the desired playback position;
during playback of the media content, receiving a second user input specifying to move the scrubber from a second playback position subsequent to the desired playback position to a third playback position different from the first playback position, wherein the second playback position comprises a current playback position at a second point in time;
dynamically saving the second playback position based on the second user input;
determining, by operation of one or more computer processors, that the third playback position is within a threshold distance of the first playback position;
snapping the scrubber to the first playback position; and
causing playback of the media content to jump back to the first playback position.

2. The computer-implemented method of claim 1, further comprising: providing haptic feedback, visual feedback, or aural feedback indicating that the scrubber was snapped to the first playback position.

3. The computer-implemented method of claim 2, wherein the haptic feedback is provided by actuating a haptic motor in a handheld device.

4. The computer-implemented method of claim 1, wherein at least one of the first user input or the second user input is received via a touchscreen mobile device, a remote control, or a video game console controller.

5. The computer-implemented method of claim 1, wherein the first user input corresponds to a user swiping the scrubber from the first playback position to the desired playback position via a touchscreen mobile device.

6. The computer-implemented method of claim 1, wherein the threshold distance comprises a predetermined temporal distance or a predetermined positional distance.

7. The computer-implemented method of claim 1, wherein each current position is dynamically saved upon each user interaction with the scrubber, whereby the first playback position and the second playback position are user-specified, and wherein the computer-implemented method further comprises:
during playback of the media content, receiving a third user input specifying to move the scrubber from a fourth playback position subsequent to the first playback position to a fifth playback position different from the second playback position, wherein the fourth playback position comprises a current playback position at a third point in time, and whereby the fourth playback position is user-specified;
dynamically saving the fourth playback position based on the third user input;
determining that the fifth playback position is within a threshold distance of the second playback position;
snapping the scrubber to the second playback position; and
causing playback of the media content to jump to the second playback position.

8. A non-transitory computer-readable medium having instructions stored thereon, wherein the instructions are executable to perform operations of:
during playback of media content, receiving a first user input specifying to move a scrubber from a first playback position to a desired playback position, wherein the first playback position comprises a current playback position at a first point in time, and wherein the scrubber is displayed on a content playback graphical user interface;
dynamically saving the first playback position based on the first user input;
causing playback of the media content to jump to the desired playback position;
during playback of the media content, receiving a second user input specifying to move the scrubber from a second playback position subsequent to the desired playback position to a third playback position different from the first playback position, wherein the second playback position comprises a current playback position at a second point in time;
dynamically saving the second playback position based on the second user input;
determining, by one or more computer processors when executing the instructions, that the third playback position is within a threshold distance of the first playback position;
snapping the scrubber to the first playback position; and
causing playback of the media content to jump back to the first playback position.

9. The non-transitory computer-readable medium of claim 8, wherein the instructions are further executable to perform an operation of: providing haptic feedback, visual feedback, or aural feedback indicating that the scrubber was snapped to the first playback position.

10. The non-transitory computer-readable medium of claim 9, wherein the haptic feedback is provided by actuating a haptic motor in a handheld device.

11. The non-transitory computer-readable medium of claim 8, wherein at least one of the first user input or the second user input is received via a touchscreen mobile device, a remote control, or a video game console controller.

12. The non-transitory computer-readable medium of claim 8, wherein the first user input corresponds to a user swiping the scrubber from the first playback position to the desired playback position via a touchscreen mobile device.

13. The non-transitory computer-readable medium of claim 8, wherein the threshold distance comprises a predetermined temporal distance or a predetermined positional distance.

14. A system, comprising:
one or more computer processors; and a non-transitory computer-readable medium having instructions stored thereon, wherein the instructions are executable by the one or more computer processors to perform operations of:

during playback of media content, receiving a first user input specifying to move a scrubber from a first playback position to a desired playback position, wherein the first playback position comprises a current playback position at a first point in time, and wherein the scrubber is displayed on a content playback graphical user interface;

dynamically saving the first playback position based on the first user input;

causing playback of the media content to jump to the desired playback position;

during playback of the media content, receiving a second user input specifying to move the scrubber from a second playback position subsequent to the desired playback position to a third playback position different from the first playback position, wherein the second playback position comprises a current playback position at a second point in time;

dynamically saving the second playback position based on the second user input;

determining that the third playback position is within a threshold distance of the first playback position;

snapping the scrubber to the first playback position; and causing playback of the media content to jump back to the first playback position.

15. The system of claim 14, wherein the instructions are executable by the one or more computer processors to perform further operations of:

providing haptic feedback, visual feedback, or aural feedback indicating that the scrubber was snapped to the first playback position.

16. The system of claim 15, further comprising a haptic motor in a handheld device configured to be actuated to provide the haptic feedback.

17. The system of claim 14, further comprising at least one of a touchscreen mobile device, a remote control, or a video game console controller configured to provide at least one of the first user input or the second user input.

18. The system of claim 14, further comprising a touchscreen mobile device, wherein the first user input corresponds to a user swiping the scrubber from the first playback position to the desired playback position via the touchscreen mobile device.

19. The system of claim 14, wherein the threshold distance comprises a predetermined temporal distance or a predetermined positional distance.

20. The system of claim 14, wherein the instructions are executable by the one or more computer processors to perform further operations of:

prior to receiving the first user input, causing display of the scrubber; and causing the scrubber to be hidden from view upon determining that a predetermined amount of time has elapsed since the scrubber was displayed.

* * * * *

UNITED STATES PATENT AND TRADEMARK OFFICE
CERTIFICATE OF CORRECTION

PATENT NO. : 10,976,913 B2  
APPLICATION NO. : 15/981806  
DATED : April 13, 2021  
INVENTOR(S) : Mohamad H. Monibi Page 1 of 1

It is certified that error appears in the above-identified patent and that said Letters Patent is hereby corrected as shown below:

In the Claims

In Column 11, Line 33, in Claim 1, delete "time:" and insert -- time; --, therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*